United States Patent [19]

Pilgrim

[11] 4,378,405
[45] Mar. 29, 1983

[54] PRODUCTION OF BUILDING BOARD

[75] Inventor: Thomas A. Pilgrim, Edwalton, England

[73] Assignee: BPB Industries Public Limited Company of Ferguson House, London, England

[21] Appl. No.: 303,317

[22] Filed: Sep. 17, 1981

Related U.S. Application Data

[63] Continuation of Ser. No. 152,861, May 23, 1980.

[30] Foreign Application Priority Data

May 30, 1979 [GB] United Kingdom ............... 7918871

[51] Int. Cl.³ .......................... B32B 3/24; B32B 5/14; B32B 13/02; B28B 1/30
[52] U.S. Cl. ................................ 428/322.7; 156/42; 428/703
[58] Field of Search ................. 428/312.4, 319.1, 703, 428/322.7; 156/39, 42

[56] References Cited

U.S. PATENT DOCUMENTS

| | | | |
|---|---|---|---|
| 3,984,266 | 10/1976 | Christensen et al. | 156/629 |
| 3,993,822 | 11/1976 | Knauf et al. | 428/312.4 |
| 4,133,928 | 1/1979 | Riley et al. | 428/255 |
| 4,159,361 | 6/1979 | Schupack | 428/312.4 |
| 4,195,110 | 3/1980 | Dierks et al. | 428/218 |
| 4,203,788 | 5/1980 | Clear | 156/44 |
| 4,288,263 | 9/1981 | Delcoigne et al. | 428/703 |
| 4,344,804 | 8/1982 | Bijen et al. | 156/42 |
| 4,351,867 | 9/1982 | Mulvey et al. | 428/703 |

FOREIGN PATENT DOCUMENTS

| | | | |
|---|---|---|---|
| 993779 | 7/1976 | Canada | 428/703 |
| 769414 | 3/1957 | United Kingdom . | |
| 772581 | 4/1957 | United Kingdom | 428/703 |
| 1520411 | 8/1978 | United Kingdom . | |
| 2004807 | 4/1979 | United Kingdom . | |

OTHER PUBLICATIONS

Offenlegungsschrift 2808723, DE-OS, published Sep. 6, 1979.

Primary Examiner—William J. Van Balen
Attorney, Agent, or Firm—Robert M. Didrick; Samuel Kurlandsky; Robert H. Robinson

[57] ABSTRACT

A building board comprises a core 31 of set cementitious material, such as gypsum, faced on at least one side by a fabric or web 33 of mineral fibres embedded in the face of the core and a continuous film 32 of the cementitious material having a higher density and lower porosity than the core extending over the outer face of the fabric. The film may have a smooth surface or a desired textured or figured surface. The preferred fabric or web 33 is a non-woven glass fibre tissue and it is preferred that a continuous film 32 of gypsum at the surface should not exceed 2 mm in thickness. The board is made by bringing the fabric or web into contact with the respective face of a layer of an aqueous slurry of gypsum plaster or other cementitious material, and vibrating the layer of slurry in contact with the fabric or web until slurry penetrates the web and the latter is completely embedded. The process can be carried out continuously by supporting the slurry between flexible belts which are vibrated by mechanical action applied to their faces remote from the slurry. Boards accordingly to the invenion can have greater strength and/or greater resistance to fire than conventional paper-faced gypsum board.

16 Claims, 2 Drawing Figures

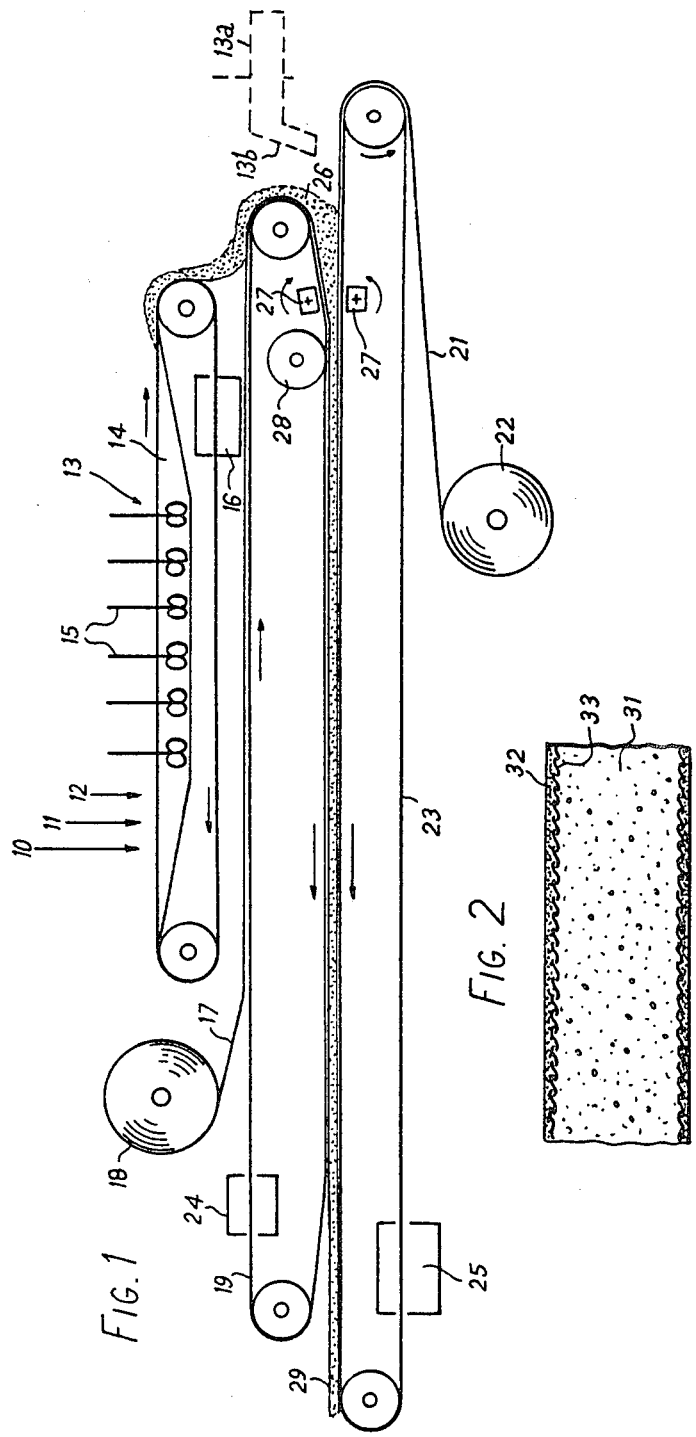

PRODUCTION OF BUILDING BOARD

This is a continuation of application Ser. No. 152,861, filed May 23, 1980.

The present invention relates to the production of building board from cementitious material such as gypsum plaster.

Conventional paper-faced gypsum or plasterboard has adequate strength and fire resistance for many purposes but there are potential applications for such board that require greater strength and/or greater resistance to fire.

It has been proposed to increase the strength of cementitious building boards by reinforcing the body of set cementitious material with fibrous materials, but this has been only partly successful. Complex processes involving the building up of a laminated product in a mould from glass fibre mats and plaster slurries, for example as described in British Pat. No. 1,520,411, are not economic, and the fibre mat extends throughout the thickness of the product.

The use of fibres, such as glass fibres, dispersed in the cementitious material encounters difficulties in the effective dispersion of the fibres in the slurry and in strength limitations arising from an inadequate bond between the fibres and the surrounding cementitious material.

Others have proposed manufacture of a product analogous to plasterboard but employing interlaced mineral fibres instead of the conventional paper facing, as in British Pat. No. 769,414. In British Pat. No. 772,581 a glass fibre tissue is passed through a plaster slurry prior to application of a layer of slurry and a second impregnated glass tissue. In each case it is doubtful whether the facing tissues would be satisfactorily impregnated and an adequate bond achieved.

In Canadian Pat. No. 993,779 it is proposed to form gypsum board by depositing a plaster slurry on a sheet of inorganic fibres on a conveyor, thereafter applying a second sheet of similar fibres and pressing the assembly between rollers to cause the slurry to penetrate into the fibrous sheets at the surfaces of the slurry mass. It has been found that such a process gives only partial and irregular penetration, leaving the resulting board with a rough surface in which both fibres and gypsum are apparent.

In U.S. Pat. No. 3,993,822 there is described a multi-layered gypsum board in which a core of gypsum and reinforcing fibres is faced on one side by a sheet of glass fibre fleece or pasteboard and on the other side by a glass fibre cloth and a sheet of glass fibre fleece, pasteboard, foil or paper. In each case the fleece or alternative sheet is resistant to the penetration of gypsum and the structure is formed by simple successive application of the different sheets and compositions to a forming table and conveyor. The product has surfaces of texture determined by that of the outer sheets in each case, which may themselves be only imperfectly bonded to the core.

British Patent Specification No. 2,013,563 (published Aug. 15, 1979) discloses the production of plasterboard faced on one surface with a conventional cardboard (paper), on which the core slurry is poured in the conventional manner while a glass fibre sheet is applied on top of the core slurry and forced into the slurry by a comb device. In this product, one face is of paper and has only the properties of conventional plasterboard, while the other face is of gypsum and largely unprotected against abrasion and other mechanical damage.

British Specification No. 2,004,807 (published Apr. 11th, 1979) describes a method of making a thin reinforced plaster sheet in which a glass fibre tissue is covered with dry plaster, vibrated to cause the plaster crystals to penetrate the tissue, and then sprayed with water with continued vibration to mix the plaster and water within the tissue. The plaster sets to form a reinforced gypsum sheet in which the fibre is distributed throughout the thickness of the sheet.

There has now been developed a novel building board and process which enables disadvantages of the prior art to be avoided or overcome with economy.

The present inventor has discovered that if a pervious fabric or web is applied to the surface of a cementitious slurry, such as a gypsum plaster slurry, and retained by a support surface, such as a release sheet or conveyor belt, and the surface is vibrated, then the slurry can be caused to penetrate through the fabric or web to form a thin continuous film on the outer surface of the latter.

Accordingly, the present invention provides a method of making a building board which comprises bringing a respective pervious fabric or web into contact with one or both faces of a layer of aqueous slurry of cementitious material such as gypsum plaster; holding the assembled slurry and fabric or web between support surfaces; vibrating the support surface or surfaces in contact with the fabric or web until the slurry penetrates through the fabric or web and the fabric or web is completely embedded in the respective face of the slurry with a continuous film of the slurry thereoever.

The previous fabric or web may have any one of a variety of forms, e.g. it may be a foraminous sheet or film of an inherently impervious material, but it is preferably fibrous and most preferably of mineral fibres.

The core need not contain fibre but small quantities can be included to enhance its coherence. The contribution of fibres to board strength is greatest when they are at or near the faces of the board, so that the maximum strength increase attainable by the use of a given quantity of fibres is realised by the use of a fabric or web embedded immediately adjacent to the surface of the core.

The reinforcing fibres are preferably glass fibres, and may be in the form of woven or knitted fabric or scrim, but are preferably in the form of a non-woven fabric or web, bonded with a suitable synthetic resin.

Embedding the fibres in the face of the core an formation of a continuous film of the cementitious material over them enhances the fineness of the final surface of the board while ensuring that the fibres are concentrated in the most effective location, as near the surface of the board as possible.

The method of this invention can readily be carried out in a continuous manner in order to produce the board continuously on a production line. Preferably, a previous fabric or web is advanced on a lower support surface, the core layer of slurry is then applied, followed by a second fabric or web, the assembly then passes beneath a second support surface, and the assembled board structure is advanced between the support surfaces while appropriate regions of the surfaces are subjected to vibration. The resulting board may be set, cut and dried in a conventional manner.

It has further been discovered that the continuous film of cementitious material, formed by penetration of the fabric or web by the slurry under the influence of vibration, is usually compacted or densified and is harder and less porous than the material of the core of the board. This can be attributed to the operation of an increased pressure at the surface, the existence of which is revealed by migration of the slurry through the fabric or web, which implies a pressure gradient in that direction.

Accordingly, in a second aspect, the invention also provides a building board comprising a core of set cementitious material, such as gypsum, faced on at least one side by a pervious fabric or web embedded in the face of the core, and a continuous film of set cementitious material having a higher density and lower porosity than the core extending over the outer face of the fabric or web.

As previously mentioned, the fabric or web should lie close to the surface, and it is preferred that the thickness of the continuous film thereover should not exceed 2 mm, or even 1 mm, but it may be as thin as possible, subject to the provision of sufficient slurry to achieve the desired surface in the finished board. The surface may be plain or have a random or patterned texture, depending on the surface of the conveyor belt or other support. The densified structure enables a fine surface finish to be achieved. The core may be of any desired thickness, for example of similar values to standard thicknesses of plasterboard.

The preferred fabrics or webs are non-woven glass fibre tissues. The tissue can be resin-bonded, for example with urea-formaldehyde, as is usual with glass tissues. Such tissue may have a weight of about 60 to 80 g/m$^2$ but this value is in no way critical, and fibres of, e.g. 10 to 20 μm diameter are suitable. Two such tissues thus represent a quantity of fibres of 120 to 160 g/m$^2$ of board, which with a standard 9 mm board thickness can be 1% to 2% based on the weight of plaster in the board. This relatively small proportion of fibres emphasises the economy of the present invention in the quantity of fibre employed, and the strength of the board can be adjusted by varying the strength of the tissues used.

The fibres in the non-woven tissue may be either randomly distributed or orientated. In the first case the board will have substantially the same breaking strength in the longitudinal (machine) and the transverse directions. In the latter case, the board can have high strength in the longitudinal direction but a lower strength in the transverse direction. In this it resembles conventional plasterboard, although the average strength of the board can be substantially increased, if desired. For example a 60 g/m$^2$ substantially random tissue applied to both faces gives a board having approximately the same strength in both directions, being greater than the transverse direction strength of conventional plasterboard but less than the longitudinal strength. The latter value is exceeded if an 80 g/m$^2$ tissue is used. Longitudinal orientation of the fibres of 60 g/m$^2$ tissue increases board strength in that direction, with corresponding reduction in transverse strength, and so can more closely approximate to the strength characteristics of conventional plasterboard. Thus, by varying the tissue characteristics, the board can be made stronger in a particular direction, or additional strength can be provided in desired locations, e.g. along the board edges, by using tissues of appropriate fibre distribution.

Woven glass fabric or scrim can be employed, but is dearer and/or less effective than non-woven tissue.

The core slurry may contain a little, e.g. 0.3 to 3%, glass fibre by weight of the plaster to increase cohesion, but may be fibre-free as for conventional plasterboard. Boards made according to the invention using mineral fibre fabric or web do not need the paper covers of conventional gypsum board or the inclusion of starch in the core slurry. They can thus be wholly of non-combustible material and the drying stage in their manufacture can be relatively rapid with attendant advantages including lower energy expenditure.

Available glass fibre tissue and scrim will ordinarily be porous enough to ensure penetration of sufficient slurry under the influence of vibration to form the desired surface film. Penetration can be increased by perforating the fabric before it is applied to the slurry. Penetration may also be helped by prewarming the slurry or adding surface active agents to the slurry.

It is possible to impregnate the fabric or web, before it is applied to the core slurry, with surface modifying additives such as water-proofing agents and reinforcing agents, for example synthetic resins. If the impregnated layer is not allowed to dry before it is applied to the core slurry, the latter in its passage through the layer will carry with it at least part of the additive present in the layer, so that the additive will desirably modify the surface film of gypsum (or other cementitious material). Thus, for example, if a water-proofing agent is applied to the fabric or web, a water-proof surface can be formed using a much smaller quantity of additive than would be necessary were the additive to be included in the core slurry in the conventional way.

The main belts between which the board is formed should be of a material to which plaster slurry does not readily adhere. Most plastics conveyor belt materials are suitable. The belts are preferably flexible to enable local vibration to be transmitted to the board assembly after the fabric has been applied to the core slurry.

Any suitable vibratory device may be used. At present it is preferred to employ horizontal rotating shafts with an angular cross-section, mounted to bear against the reverse faces of the belts. Apart from simple mechanical devices, other vibratory systems including ultrasonic systems, can be utilized.

One technique for the production of mineral fibre faced gypsum board in accordance with this invention will now be described, by way of example, with reference to the accompanying drawings.

In the drawings:

FIG. 1 is a diagrammatic side view of apparatus for making gypsum board in accordance with the invention: and FIG. 2 is a diagrammatic section (not to scale) of the board of this invention.

As shown in FIG. 1 water 10, beta-hemihydrate gypsum plaster 11, with conventional additives and up to 3% chopped glass fibres 12 of the desired length, are introduced into a mixer 13 comprising a trough belt conveyor 14 and agitators 15, in conventional proportions and are discharged continuously from the mixer as a uniform slurry.

If smaller proportions of chopped glass fibre, or no fibre at all, are to be included in the core, the trough mixer 13 need not be used. Instead a simple screw mixer, or a rotating plate mixer of the Ehrsam type, 13a can be substituted, discharging onto the web 21 through a chute 13b.

A web of glass fibre tissue 17 is supplied from a roll 18 and laid on the upper surface of the return run of an upper support conveyor belt 19. A second web of glass tissue 21 is supplied from a roll 22 to the surface of a lower support conveyor belt 23. The conveyor belts are conveniently formed of polypropylene and provided with respective belt washers 24 and 25, and are driven in the directions of the arrows. Lengths of square section belting secured along the lateral edges of the lower belt 23 serve to confine the slurry and determine the width of the board, as described later.

The plaster slurry supplied by the mixer 13 forms a 'dam' 26 between the converging belts 19 and 23 and layers of tissue 21 and 24) at the entrance to the space between the pair of support conveyors. At the entrance, the belts pass over and in contact with respective vibrators 27, which may for example take the form of square section shafts rotated at a sufficient speed as shown, for example at about 1,000 rpm. The vibration applied by the vibrators 27 through the support belts causes the tissues 21 and 24 to become embedded in the respective surfaces of the slurry, which penetrates through the tissue to form continuous films in contact with the support belts on both sides of the core and tissue assembly.

The composite assembly, held between the belts 21 and 24, then passes beneath a roller 28 to gauge it to the required thickness and, by the time it reaches the end of the conveyors, the plaster is sufficiently set, and the resulting board 29 is divided into lengths and passed into a contiuous drier in the conventional way.

The result is a gypsum board with a largely conventional core 31 and smooth surface layers 32 of minimal thickness but greater density overlaying the fibrous tissues 33. The fibrous tissue reinforcement is concentrated in the surface an confers on the board the maximum strength properties achieveable from a given weight of fibre per unit board area. The hard, dense surface layers 32 confer a high finish on the board surfaces.

In a typical example of board produced in the manner described, plasterboard of 9 mm nominal thickness was faced with urea-formaldehyde bonded tissue of weight 60 g/m$^2$ formed from glass fibres of 13$\mu$diameter. With a core containing 0.3% by weight chopped glass fibre (an optional feature), the modulus of rupture of the board was 7.3 N/mm$^2$ in both longitudinal and transverse directions.

The board produced in accordance with this invention has a compacted surface, the structure of which has been investigated microscopically.

Scanning electron-micrographs reveal that the surface layer of gypsum, which is above the embedded glass fibre web and has been formed by penetration of the slurry through the web under the influence of the vibration, is dense, and is made up of a highly compacted outer skin with a less compacted region between this outer skin and the glass fibre web. The core, in contrast, is more porous, while the gypsum immediately below the level of the web is also relatively porous and resembles the core rather than the surface layer.

In the case of a particular board produced as described in the Example above, scanning electron-micrographs and quantitative measurements showed the said surface layer above the glass fibre web to be 0.17 mm thick, and the said highly compacted outermost skin forming part of this layer was 0.03 mm thick; the density of the top 0.1 mm of the surface layer (sampling of a thinner portion not being possible) was 1.158 g/cc, the density of the said outermost skin thus being even higher. Other density measurements made on the same board were as follows:

Density of a 1.7 mm thick section immediately behind the glass fibre web—1.096 g/cc.;

Density of a 1.9 mm thick section in the centre of the core—1.095 g/cc.;

Density of a 0.66 mm thick section from the top of the board including the fibre web and outermost skin—0.983 g/cc.;

Density of the above 0.66 mm thick section with the outermost skin removed (i.e. section 0.63 mm thick)—0.946 g/cc (thus the density of the gypsum in the region of the glass fibre web is lower than in the surrounding core);

Gypsum density in the region of the glass fibre web (determined by dissolving the gypsum using 20% hydrochloric acid and correcting for the effects of the acid on the glass fibre)—0.995 g/cc.

The above density values are to be compared with the core density of conventional gypsum board which is 0.86 g/cc.

It will be appreciated that whilst there is density and porosity variation of the set cementitious material in passing from the outer surface to the core of boards according to the invention, and whilst reference is made to different layers or sections of the board (e.g. surface layer or film, outermost skin, core), a board according to the invention is generally an integral article, with the set cementitious material (e.g. gypsum) forming a continuous and integral matrix extending from one face through the or each pervious fabric or web to the other face. "Core" is used herein to mean not only the centre section of a board having the pervious fabric or web at both opposed major surface regions, but also the equivalent section of a board having the pervious fabric or web at one of these surface regions.

As previously mentioned the pervious fabric or web is preferably fibrous, most preferably comprising mineral fibres, with glass fibres currently being of greatest interest. The phenomenon of formation over the pervious fabric or web of a continuous film of set cementitious material denser and less porous than that of the core, due to penetration of the core slurry through the fabric or web as a result of the vibration technique, can however occur to some advantage with other forms of fabric or web pervious to the slurry; the slurry can for example so penetrate and form a continuous densified film over a foraminous sheet of inherently slurry-impervious material, e.g. a plastics sheet having a multiplicity of perforations.

At least one of perlite, vermiculite and urea/formaldehyde resin aggregate may be included in the mix for the core; such additive generally does not penetrate the pervious fabric or web.

Boards of the invention need not have such high densities as those in the above example, though the density variation will generally follow a similar pattern.

What is claimed is:

1. A method for making a building board having a pervious fabric embedded in at least one face thereof, said method consisting essentially of advancing a first support surface and a second support surface in converging relationship to each other, applying a layer of a pervious fabric to at least one of the support surfaces, depositing an aqueous slurry of cementitious material such as gypsum plaster between the advancing support surfaces and vibrating the support surface in contact with the fabric until the slurry penetrates through the fabric.

2. The method of claim 1 wherein the first support surface converges with the second support surface from a position overlying the second support surface, a layer of fabric is applied to the first support surface, and the slurry is applied to the fabric layer.

3. The method of claim 1 wherein the first support surface converges with the second support surface from a position overlying the second support surface, a layer of fabric is applied to the second support surface and the slurry is applied to the fabric layer.

4. The method of claim 1 wherein a layer of pervious fabric is applied to both support surfaces.

5. A method according to claim 1, wherein the support surfaces are flexible belts and are vibrated by mechanical action applied to the faces thereof remote from said slurry.

6. A method according to claim 1 wherein chopped mineral fibre is incorporated in said slurry in an amount up to 3% by weight of the cementitious material.

7. A method according to claim 1 wherein said fabric or web is impregnated with water-proofing or reinforcing agents before it is applied to the core slurry.

8. A method according to claim 1 wherein said pervious fabric or web is fibrous.

9. A method according to claim 1 wherein said fabric or web is a resin-bonded non-woven glass fibre tissue.

10. A building board comprising an integral matrix of set cementitious material such as gypsum which extends from one face of the board to the other face of the board, a pervious fabric embedded in at least one of the faces, and characterized further in that at least one of said faces is a continuous film of the set cementitious material of said matrix which extends over the outer face of said fabric and which has a higher density and lower porosity than that of the portion of the matrix which lies on the inner face of the fabric.

11. A building board comprising a core of set gypsum, a pervious fabric embedded in at least one face of said core, and a continuous film of set gypsum having a higher density and lower porosity than said core extending over the outer face of said fabric; wth the proviso that said core and said film comprise a continuous and integral matrix of set gypsum.

12. A building board according to claim 10 wherein said pervious fabric or web is of mineral fibres.

13. A building board according to claim 12, wherein said mineral fibres are glass fibres.

14. A building board according to claim 13 wherein said fabric or web is a resin-bonded non-woven glass fibre tissue.

15. A building board according to claim 10 wherein the thickness of said continuous film does not exceed 2 millimeters.

16. A building board according to claim 10 wherein said continuous film includes an outermost skin of higher density and less porosity than the remainder of said film.

* * * * *